United States Patent
Kim et al.

(10) Patent No.: US 10,402,053 B2
(45) Date of Patent: Sep. 3, 2019

(54) DISPLAY SYSTEM

(71) Applicants: Hyundai Motor Company, Seoul (KR); Kia Motors Corporation, Seoul (KR)

(72) Inventors: Dae Sik Kim, Seoul (KR); Jae Seok Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 193 days.

(21) Appl. No.: 15/304,706

(22) PCT Filed: Apr. 24, 2014

(86) PCT No.: PCT/KR2014/003602
§ 371 (c)(1),
(2) Date: Nov. 28, 2016

(87) PCT Pub. No.: WO2015/163497
PCT Pub. Date: Oct. 29, 2015

(65) Prior Publication Data
US 2017/0075522 A1 Mar. 16, 2017

(51) Int. Cl.
*G06F 3/0482* (2013.01)
*B60K 35/00* (2006.01)
(Continued)

(52) U.S. Cl.
CPC ............ *G06F 3/0482* (2013.01); *B60K 35/00* (2013.01); *B60K 37/00* (2013.01); *B60K 37/02* (2013.01);
(Continued)

(58) Field of Classification Search
CPC .......... G06F 3/04817; G06F 8/61; B60L 3/12; B60L 11/1842
See application file for complete search history.

(56) References Cited

U.S. PATENT DOCUMENTS 6,434,450 B1  8/2002 Griffin, Jr. et al.
6,553,309 B2 *  4/2003 Uchida .............. G01C 21/3611
340/995.1
(Continued)

FOREIGN PATENT DOCUMENTS

CN   1704886 A   12/2005
CN  102481850 A    5/2012
(Continued)

OTHER PUBLICATIONS

Extended European Search Report for European Patent Application No. EP 14890116, dated Dec. 13, 2017, 7 pages.
(Continued)

*Primary Examiner* — Hien L Duong
(74) *Attorney, Agent, or Firm* — Mintz Levin Cohn Ferris Glovsky and Popeo, P.C.; Peter F. Corless (57) ABSTRACT

A display system, according to one embodiment of the present invention, comprises: a display unit for displaying information related to vehicle driving; an input unit into which data is input according to a user's operation; and a control unit responding to the data so as to control the information, related to vehicle driving, to be displayed through the display unit. The information related to vehicle driving includes a plurality of items for information exhibiting the driving status of the vehicle or peripheral information on the vehicle. The display unit displays the information related to vehicle driving through a "my menu" providing a particular item selected from the plurality of items according to the user's operation, and the selected particular item provided in the "my menu" is implemented as a widget.

11 Claims, 5 Drawing Sheets

(51) Int. Cl.
    *B60K 37/00*     (2006.01)
    *B60K 37/02*     (2006.01)
    *G06F 3/0484*     (2013.01)
    *G06F 3/0488*     (2013.01)
    *B60K 37/06*     (2006.01)

(52) U.S. Cl.
    CPC .......... *B60K 37/06* (2013.01); *G06F 3/04842* (2013.01); *G06F 3/04886* (2013.01); *B60K 2370/1438* (2019.05); *B60K 2370/16* (2019.05); *B60R 2300/207* (2013.01)

(56) References Cited

U.S. PATENT DOCUMENTS

| | | | |
|---|---|---|---|
| 7,584,049 B2 * | 9/2009 | Nomura | G01C 21/32 340/995.19 |
| 8,344,870 B2 | 1/2013 | Evans et al. | |
| 2004/0090315 A1 * | 5/2004 | Mackjust | B60R 25/104 340/426.13 |
| 2005/0167172 A1 | 8/2005 | Fernandez | |
| 2005/0267676 A1 | 12/2005 | Nezu et al. | |
| 2007/0051544 A1 | 3/2007 | Fernandez | |
| 2007/0061732 A1 * | 3/2007 | Bobbin | G06F 3/04817 715/739 |
| 2008/0005700 A1 * | 1/2008 | Morikawa | G06F 3/0482 715/841 |
| 2008/0094421 A1 * | 4/2008 | Maeda | G06F 3/0481 345/661 |
| 2009/0108803 A1 | 4/2009 | Singarajan et al. | |
| 2010/0062811 A1 * | 3/2010 | Park | G06F 3/0482 455/566 |
| 2010/0127847 A1 * | 5/2010 | Evans | G06F 3/04817 340/461 |
| 2011/0004822 A1 | 1/2011 | Nezu et al. | |
| 2011/0241905 A1 | 1/2011 | Niwa | |
| 2011/0106365 A1 * | 5/2011 | Miyake | B60K 35/00 701/31.4 |
| 2011/0216026 A1 * | 9/2011 | Jeon | G06F 3/041 345/173 |
| 2011/0224854 A1 | 9/2011 | Kalhous et al. | |
| 2012/0015693 A1 * | 1/2012 | Choi | H04M 1/72566 455/566 |
| 2012/0019204 A1 * | 1/2012 | Matsuo | B60L 3/12 320/109 |
| 2012/0068948 A1 * | 3/2012 | Tomoda | G06F 3/04886 345/173 |
| 2013/0024818 A1 * | 1/2013 | Rainisto | G06F 3/0482 715/838 |
| 2013/0096819 A1 * | 4/2013 | Tamok | G01C 21/00 701/428 |
| 2013/0097549 A1 * | 4/2013 | Park | G06F 3/04886 715/773 |
| 2013/0179061 A1 * | 7/2013 | Gadh | B60L 11/1842 701/123 |
| 2013/0246918 A1 | 9/2013 | Nezu et al. | |
| 2013/0246961 A1 | 9/2013 | Nezu et al. | |
| 2014/0035357 A1 * | 2/2014 | Hausmann | B60L 3/0046 307/9.1 |
| 2014/0109080 A1 * | 4/2014 | Ricci | G06F 8/61 717/174 |
| 2014/0195972 A1 * | 7/2014 | Lee | G06F 3/04817 715/811 |
| 2014/0300648 A1 | 10/2014 | Jun et al. | |
| 2015/0012941 A1 | 1/2015 | Nezu et al. | |
| 2016/0179334 A1 * | 6/2016 | Fleizach | H04M 19/04 715/863 |

FOREIGN PATENT DOCUMENTS

| | | |
|---|---|---|
| DE | 102011116141 A1 | 4/2013 |
| JP | H11220808 A | 8/1999 |
| JP | 2001-121989 A | 5/2001 |
| JP | 2005-164249 A | 6/2005 |
| JP | 2011121989 A | 6/2011 |
| JP | 2011214894 A | 10/2011 |
| JP | 2012-207941 A | 10/2012 |
| JP | 5108041 B2 | 12/2012 |
| JP | 2013-115451 A | 6/2013 |
| JP | 2013-224836 A | 10/2013 |
| KR | 10-0256749 B1 | 5/2000 |
| KR | 10-0591043 B1 | 6/2006 |
| KR | 10-0856491 B1 | 9/2008 |
| KR | 10-2009-0129855 A | 12/2009 |
| KR | 10-0981175 B1 | 9/2010 |
| KR | 2010-0138530 A | 12/2010 |
| KR | 10-2011-0117980 A | 10/2011 |
| RU | 96275 U1 | 7/2010 |
| WO | 2013-053463 A2 | 4/2013 |

OTHER PUBLICATIONS

International Search Report, dated Jan. 22, 2015, issue in PCT/KR2014/003602.

Office Action for Russian Application No. 2016145593, dated Feb. 12, 2018, 11 pages, English translation.

* cited by examiner

DISPLAY SYSTEM

TECHNICAL FIELD

The present disclosure relates to a display system, and more particularly, to a display system capable of updating and displaying information related to driving of a vehicle in real time.

BACKGROUND

Generally, information related to driving of a vehicle and information on whether or not abnormality is present in the vehicle are provided to a driver (a user) of the vehicle through a head-up unit or cluster.

The corresponding head-up unit or cluster includes a display unit providing a visual display to the user. The head-up unit or cluster receives corresponding data through various input and output sensors connected to an engine control module (ECM) provided in the vehicle and visually provides the corresponding data to the user.

The display unit has been mounted in front dashboards of all vehicles that are currently released. As described above, the display unit is mounted in the vehicle, such that the vehicle may diagnose a vehicle state and obtain vehicle information based on a diagnosis result from the ECM of the vehicle. The vehicle information includes all information on the vehicle, such as fuel efficiency, a revolution per minute (RPM), a speed, vehicle driving information, and the like.

However, this information is not provided to the user in real time without a separate manipulation of the user of the vehicle, even though it is varied and updated in real time.

TECHNICAL PROBLEMS TO BE SOLVED

The present disclosure has been made to solve the above-mentioned problems occurring in the prior art while advantages achieved by the prior art are maintained intact.

An aspect of the present disclosure provides a display system capable of displaying a specific item related to driving of a vehicle selected from a user as a widget in real time as well as simply displaying driving information of the vehicle.

THE SOLUTIONS TO SOLVE THE PROBLEMS

According to an exemplary embodiment of the present disclosure, a display system includes: a display unit displaying information related to driving of a vehicle; an input unit inputting data depending on a manipulation of a user; and a controller controlling such that the information related to the driving of the vehicle is displayed through the display unit, wherein the information related to the driving of the vehicle includes a plurality of items for information indicating a state in which the vehicle is driving or information on a surrounding of the vehicle, wherein the display unit displays the information related to the driving of the vehicle on a my menu having a plurality of specific items selected depending on a manipulation of the user, and the selected specific item is implemented by a widget.

According to an exemplary embodiment of the present disclosure, the my menu is displayed on a main screen occupying a half or more of an entire region of the display unit.

According to an exemplary embodiment of the present disclosure, the selected specific item may be updated in real time in response to an update of the driving state of the vehicle.

According to an exemplary embodiment of the present disclosure, the widget may be switched into a detailed screen displaying the selected specific item displayed by the widget on the map screen in detail depending on a manipulation of the user.

According to an exemplary embodiment of the present disclosure, the display unit may include a touch panel to which the data are input depending on a touch operation of the user.

According to an exemplary embodiment of the present disclosure, the controller may change at least one of a display size, a display position, and a display scheme of the selected specific item displayed through the my menu in response to the data input to the input unit.

According to an exemplary embodiment of the present disclosure, the controller may receive information updated depending on the driving of the vehicle, generate a driving pattern of a driver that is driving the vehicle depending on the updated information, update the selected specific item in real time depending on the generated driving pattern, and display the selected specific item updated in real time through the display unit.

According to an exemplary embodiment of the present disclosure, the display system may further include, in the case in which the vehicle is a vehicle driven using electricity as power: a battery management system (BMS) configured to manage a state of a battery provided in the vehicle; and a sensor unit configured to measure and sense the driving state of the vehicle, wherein the controller calculates a drivable distance of the vehicle on the basis of information on the battery input from the BMS and a speed of the vehicle sensed from the sensor unit and displays the drivable distance on the my menu or displays a remaining capacity of the battery on the my menu based on the information on the battery.

According to an exemplary embodiment of the present disclosure, the controller may allow information on a charging station or a gasoline station closest to the vehicle in a driving direction of the vehicle to be displayed through the my menu.

According to an exemplary embodiment of the present disclosure, when a map is selected by a manipulation of the user, the controller displays the map, a position of the vehicle on the map, and the selected specific item.

According to an exemplary embodiment of the present disclosure, the controller extracts use history of the my menu, and provides the user with a message requesting the user if the user desires the selected specific item to be automatically updated depending on the extracted use history.

EFFECTS OF THE INVENTION

A display system is capable of displaying a specific item related to driving of a vehicle selected from a user as a widget in real time as well as simply displaying driving information of the vehicle.

A display system is capable of enhancing careful driving by displaying a specific item updated in real time depending on driving of a vehicle by a widget through a display unit without a separate manipulation of a user to decrease distraction depending on the driving of the vehicle by the user.

DETAILED DESCRIPTION

Advantages and features of the present disclosure and methods accomplishing them will become apparent from exemplary embodiments described below in detail with reference to the accompanying drawings. However, the present disclosure is not limited to exemplary embodiments described herein, but may be implemented in other forms. These exemplary embodiments are provided in order to describe the present disclosure in detail so that those skilled in the art to which the present disclosure pertains may easily practice the spirit of the present disclosure.

In the accompanying drawings, exemplary embodiments of the present disclosure are not limited to illustrated specific forms, but are exaggerated for the purpose of clarity. Although specific terms have been used in the present specification, they are used in order to describe the present disclose and are not used in order to limit the meaning or the scope of the present disclosure, which is disclosed in the appended claims.

In the present specification, a term 'and/or' is used as the meaning including at least one of components arranged before and after the term. In addition, terms 'connected/coupled' are used as the meaning including that any component is directly connected to another component or is indirectly connected to another component through the other component. Unless explicitly described to the contrary, a singular form includes a plural form in the present specification. In addition, components, steps, operations, and elements mentioned by terms 'include' or 'including' used in the present specification mean the existence or addition of one or more other components, steps, operations, and elements.

Hereinafter, an exemplary embodiment of the present disclosure will be described in detail with reference to the accompanying drawings.

Figure 1:
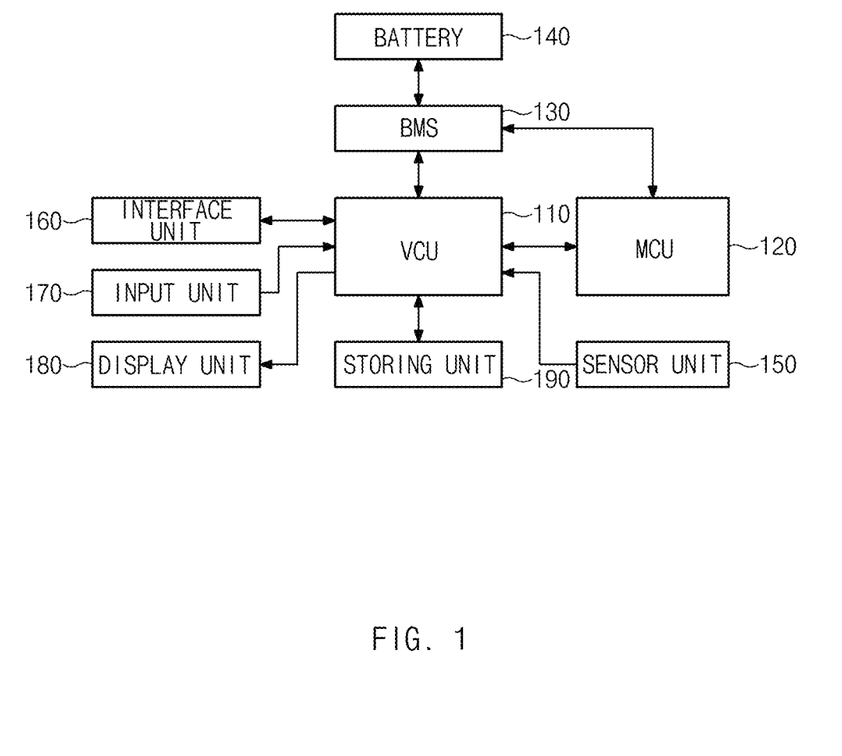
FIG. 1 is a block diagram schematically illustrating internal components of a vehicle according to an exemplary embodiment of the present disclosure.

FIG. 1 is a block diagram schematically illustrating internal components of a vehicle according to an exemplary embodiment of the present disclosure.

A vehicle according to an exemplary embodiment of the present disclosure includes an input unit 170, a display unit 180, a sensor unit 150, an interface unit 160, a motor controller unit (MCU) 120, a battery management system (BMS) 130, a battery 140, and a controller (VCU) 110 controlling the whole depending on driving and an operation of the vehicle, as illustrated in FIG. 1.

The battery 140 is charged by power supplied from the outside to store high-voltage electric energy therein and supply operation power to the vehicle. The battery 140 is formed of at least one high-voltage battery cell.

The BMS 130 checks a remaining capacity of the battery 140 to decide whether the battery 140 needs to be charged, and performs management depending on the supply of a charging current of stored in the battery to the respective components of the vehicle. The BMS 130 includes a battery controller unit (BCU) 131 controlling the battery.

Here, the BMS 130 uniformly maintains a voltage difference between cells in the battery at the time of charging and using the battery to control the battery so as not to be over-charged or over-discharged, thereby increasing a lifespan of the battery.

In addition, the BMS 130 may allow the vehicle to be driven for a long period of time by managing the use of a current, and includes a protection circuit for a supplied current.

The interface unit 160 includes manipulation means for driving such as a steering wheel, an accelerator, and a brake. In addition, the interface unit 160 includes a plurality of switches, buttons, and the like, for operating a turn signal lamp, a tail lamp, a head lamp, a brush, and the like.

The input unit 170, which is an input means for inputting predetermined data by a manipulation of a user (for example, a driver), and includes a button, a switch, and a rotary switch, and an input function of a touch pad also serves as the input unit.

The display unit 180 includes a display displaying information, a speaker outputting music, effect sound, and warning sound, various states, and the like. In the case in which the display unit 180 is a touch screen, the touch screen serves as an input unit inputting data depending on a touch manipulation as well as the display unit displaying information.

The sensor unit 150 senses and inputs a signal generated during driving of the vehicle or a predetermined operation, and inputs the signal to the VCU 110. The sensor unit 150 includes a plurality of sensors disposed inside and outside the vehicle to input various sensing signals. Here, kinds of sensors may also be different from each other depending on positions at which the sensors are installed.

The MCU 120 generates a control signal for driving at least one connected motor to control driving of the motor. In addition, the MCU 120 allows high-voltage power to be changed to be appropriate for characteristics of the motor, and allows the changed power to be supplied to the motor.

The VCU 110 manages the battery 140 through the BMS 130, performs a control by generating and applying a predetermined command so that a set operation is performed depending on inputs of the interface unit 160 and the sensor unit 150, and controls input and output of data to allow an operation state of a home appliance to be displayed.

The VCU 110 not only controls the vehicle depending on the data input through the input unit 170, but also allows information corresponding to the input data to be output through the display unit 180.

Particularly, the VCU 110 allows information related to a specific item selected depending on an input of the driver through the input unit 170 to be updated in real time depending on the driving of the vehicle and allows the information updated depending on the driving of the vehicle to be displayed in real time, with respect to an information screen displayed through the display unit 180.

Figure 2:
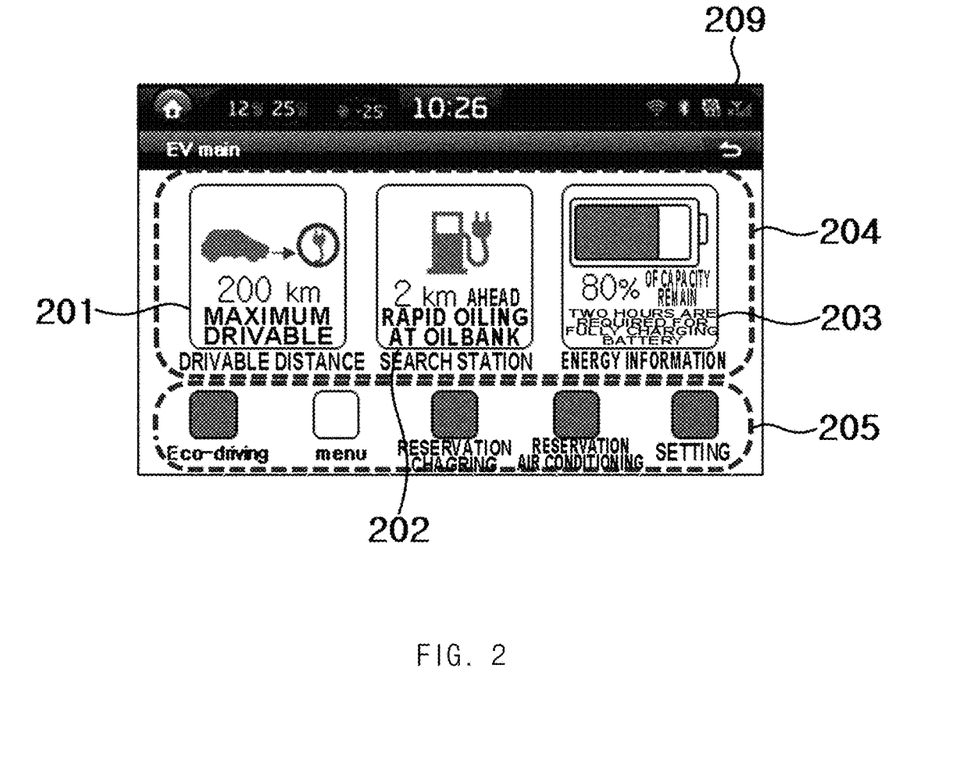
FIG. 2 is an illustrative view illustrating an example of a main screen on which vehicle information of a vehicle and information on the surrounding of the vehicle are displayed according to an exemplary embodiment of the present disclosure.

FIG. 2 is an illustrative view illustrating an example of a main screen on which vehicle information of a vehicle and information on the surrounding of the vehicle are displayed according to an exemplary embodiment of the present disclosure.

Referring to FIG. 2, vehicle information and information on the surrounding of the vehicle are displayed on a main screen 209 of the display unit 180.

A basic menu 205 and my menu 204 related to the vehicle information are displayed on the main screen 209 of the display unit 180.

When a predetermined menu item is selected through the input unit 170, the VCU 110 controls the display unit 180 to display the selected menu item as my menu 204 on the main screen 209.

Here, the respective menu items configuring the main screen 209 consist of a widget of a selected specific item, and the widget may be basically mounted or be newly downloaded or updated through connection of a terminal, connection of the Internet, or the like. In addition, the widget may be additionally installed by providing a separate detachable memory and updating data of the memory.

Here, the widget is not an icon simply displaying what the selected specific item is, but displays update information of the corresponding selected specific item updated depending on the driving of the vehicle in real time. That is, since a driving state of the vehicle and information depending on the driving of the vehicle are displayed in real time without a separate manipulation of the driver that is to confirm the update information of the corresponding selected specific item, the driver driving the vehicle may confirm the corresponding information without a separate manipulation distracting the driving of the vehicle in order to confirm the corresponding information. Therefore, the driver may concentrate on the driving of the vehicle. As a result, stability of the driving of the vehicle is enhanced.

The VCU 110 may add or delete widgets for the respective menu items depending on the input of the input unit 170, and may install the widgets for the respective menu items by sensing new data or changed data of the memory. Here, the vehicle further includes a data unit (not illustrated) in which widget data and the vehicle information are stored.

My menu 204 is a menu selected by the driver, and a display position or size of my menu 204 may also be set by the driver. Here, my menu 204 is displayed at a size larger than that of the basic menu 205.

In addition, my menu 204 is updated in real time as the information on the driving of the vehicle is changed depending on the driving state, updated information is displayed by a widget through the display unit, and my menu may be displayed as an icon, an image, or a moving image.

For example, a drivable distance 201, charging station information 202, and energy information 203 may be displayed in my menu 204 by the driver.

These three my menus may be displayed at the same size, respectively, as illustrated in FIG. 2, and the drivable distance, a distance up to a charging station, and the energy information may be continuously updated and displayed in real time as the vehicle is driven.

A size of each my menu may be varied depending on the number of selected menus, and a display size of each my menu may also be adjusted, such that any one of my menus may be displayed at a larger size.

For example, the drivable distance may be displayed at the largest size, and the charging station information and the energy information may be displayed at a size smaller than that of the drivable distance at the right of the drivable distance.

In addition, the VCU 110 may extract a use history (for example, a use frequency, a display size, or the like) of my menu depending on the driving of the vehicle by the driver, and may automatically update my menu that is being displayed depending on the extracted use history of my menu. Therefore, the driver may readily configure specific items specialized in his/her vehicle use history through my menu or update the corresponding information.

In addition, the VCU 110 may generate a driving pattern of the driver driving the vehicle depending on data transferred from the BMS 130, the interface unit 160, and the sensor unit 150, update a specific item selected as my menu in real time depending on the generated driving pattern, and display the updated specific item through the display unit 180.

Items such as eco-driving, a menu, reservation charging, reservation air conditioning, setting, and the like, may be displayed in the basic menu 205.

Here, the basic menu 205 may be positioned at any one of a left side, a right side, an upper portion, and a lower portion of the screen depending on setting.

Figure 3:
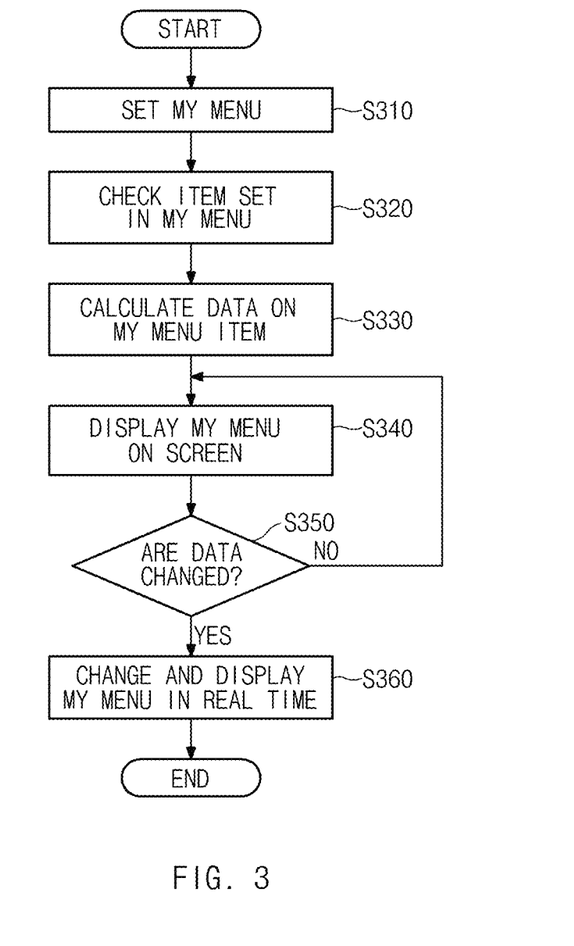
FIG. 3 is a flow chart illustrating a method of setting a menu screen of a vehicle according to an exemplary embodiment of the present disclosure.

FIG. 3 is a flow chart illustrating a method of setting a menu screen of a vehicle according to an exemplary embodiment of the present disclosure.

Referring to FIG. 3, displayed my menu may be selected and set through a setting item of the main screen 209 (S310).

In the case in which a preset item is present in my menu, the preset my menu item and remaining menu items that are not selected may be displayed in a state in which they are distinguished from each other, and my menu item is set depending on the data input through the input unit 170, that is, selection of the driver.

Here, the preset item may be removed and a new item may be added, and display information or a display scheme for each item may be changed.

After my menu is set, the VCU 110 checks an item set in my menu (S320). Here, the VCU 110 confirms whether or not my menu items are changed and the display information or the display scheme for each item is changed.

The VCU 110 collects information on each item and calculates data on the collected information in order to display my menu items on the main screen 209 of the display unit 180 (S330).

For example, in the case of the drivable distance, a distance at which the vehicle may be driven ahead may be calculated depending on at least one of a remaining capacity of battery or fuel, a current driving speed, and a driving pattern.

The VCU 110 allows my menu to be displayed on a screen of the display unit 180, for example, the main screen 209 on the basis of the calculated data (S340).

Here, the VCU 110 continuously confirms whether or not the data are changed with respect to each my menu item (S350), maintains a current display (S340) in the case in which the data are not changed, and again calculates the changed data and changes and displays my menu in real time (S360) in the case in which the data are changed.

Figure 4:
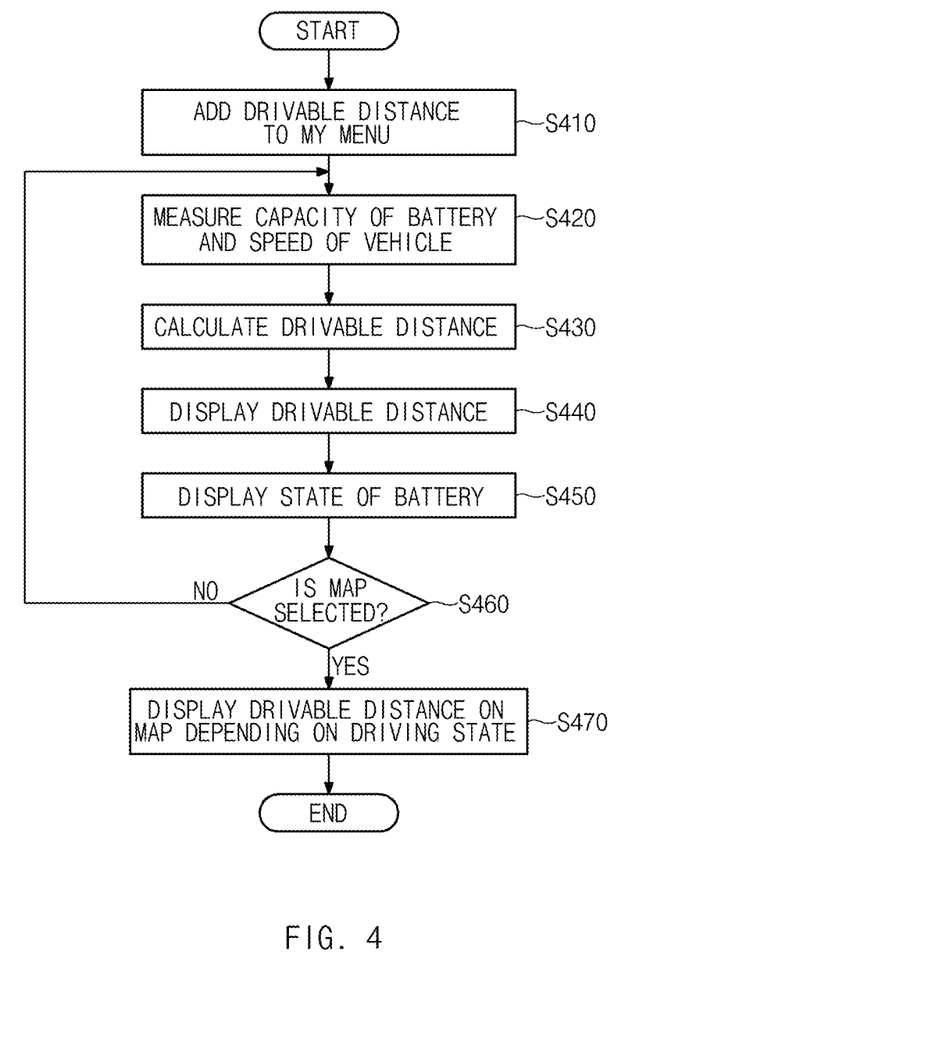
FIG. 4 is a flow chart illustrating a method of displaying information of a vehicle according to an exemplary embodiment of the present disclosure.

FIG. 4 is a flow chart illustrating a method of displaying information of a vehicle according to an exemplary embodiment of the present disclosure.

When an item for the drivable distance is added at the time of setting my menu (S410), the VCU 110 requests data to the BMS 130 and the sensor unit 150.

The BMS 130 measures a state of the battery 140 and inputs information on the state of the battery 140 to the VCU (110), and the sensor unit 150 collects information on a speed of the vehicle and a driving state of the vehicle and applies the information on the speed of the vehicle and the driving state of the vehicle to the VCU 110 (S420).

The VCU 110 calculates the drivable distance of the vehicle on the basis of the received information on the state of the battery and the speed of the vehicle (S430). Here, the VCU 110 may calculate the drivable distance using other data, for example, additional data such as a driving pattern of the vehicle, a frequency at which the driver steps on a brake, an acceleration frequency, and the like, in addition to the remaining capacity of the battery and the speed of the vehicle.

The VCU 110 outputs the calculated drivable distance through the display unit 180 (S440). The drivable distance is displayed on the main screen 209 of the display unit 180, as illustrated in FIG. 2 described above.

In addition, the VCU 110 may allow the state of the battery to be displayed on the main screen 209 on the basis of the received information on the state of the battery (S450).

My menu displayed as described above is continuously varied and displayed as the vehicle is driven.

Meanwhile, in the case in which a map is selected (S460) in the state in which the drivable distance and the state of the battery are displayed on the main screen 209, the VCU 110 changes a screen of the display unit 180 into a map screen, displays a position of the vehicle on the map screen, and displays the drivable distance on the map screen (S470).

Here, my menu items such as the state of the battery, and the like, may be displayed together with the drivable distance on the map screen. In addition, information on the surrounding of the vehicle is also displayed on the map screen. In some cases, road guidance information is also displayed.

Figure 5:
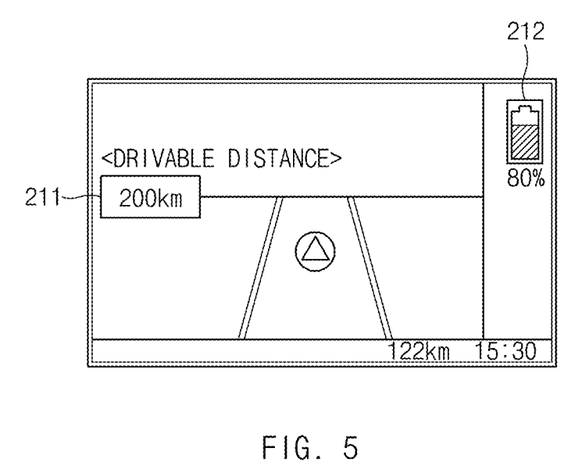
FIGS. 5 and 6 are illustrative views illustrating a screen on which vehicle information of a vehicle and information on the surrounding of the vehicle are displayed according to an exemplary embodiment of the present disclosure.
Figure 6:
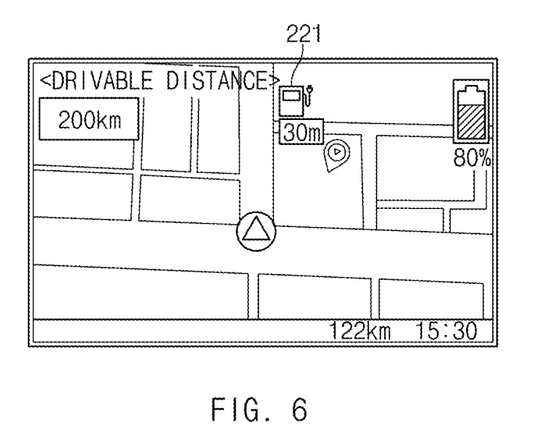

FIGS. 5 and 6 are illustrative views illustrating a screen on which vehicle information of a vehicle and information on the surrounding of the vehicle are displayed according to an exemplary embodiment of the present disclosure.

In the case in which the map is selected on the main screen 209, the map is displayed on the screen of the display unit 180, as illustrated in FIG. 5.

My menu item, for example, a drivable distance 211 is displayed on any one side of the screen. Here, a position on which the drivable distance is displayed is changed depending on setting. In some case, when the driver clicks and drags a position, the drivable distance 211 moves to and is displayed on the dragged position.

In addition, a remaining capacity 212 of the battery may be displayed as an image on any one side of the map screen.

The road guidance information as well as the map information is included in the map screen, such that information on a distance up to a destination and a local time are displayed together with each other on the map screen.

In addition, the information on the surrounding of the vehicle, for example, information on a charging station or an oil station is displayed on the map screen, as illustrated in FIG. 6.

In the case in which the charging station is selected in my menu, a position 221 of a charging station or an oil station closest to the vehicle in a driving direction is displayed, and a distance up to the charging station or the oil station may also be displayed.

As a result, the display system according to an exemplary embodiment of the present disclosure does not simply arrange icons, but sets and displays the specific item selected by the driver as my menu. Therefore, the display system may provide information changed in real time on the main screen, such that the driver may directly confirm the information updated in real time. In addition, since information of my menu displayed depending on a vehicle driving pattern of the driver is also updated and displayed depending on the driving of the vehicle, it is easy to confirm the information without a separate manipulation while driving the vehicle.

As described above, the display system according to the exemplary embodiment of the present disclosure may not only simply display the driving information of the vehicle, but may also display the specific item related to the driving of the vehicle selected from the user by the widget in real time.

What is claimed is:

1. A display system comprising:
a display unit displaying information related to driving of a vehicle;
an input unit inputting data depending on a manipulation of a user; and
a controller controlling such that the information related to the driving of the vehicle is displayed through the display unit,
wherein the information related to the driving of the vehicle includes a plurality of items for information indicating a state in which the vehicle is driving or information on a surrounding of the vehicle,
wherein the display unit displays the information related to the driving of the vehicle on a my menu having a plurality of specific items selected depending on a manipulation of the user,
wherein the selected specific item is implemented by a widget,
wherein a preset item present in the my menu and remaining items are displayed in a state in which they are distinguished from each other when selecting the plurality of specific items,
wherein the controller extracts a use history of the selected specific item depending on the driving of the vehicle, and updates automatically the selected specific item that is being displayed depending on the extracted use history of each item, and
wherein a display size of the selected specific items is varied depending on the number of the selected specific items.

2. The display system according to claim 1, wherein the my menu is displayed on a main screen occupying a half or more of an entire region of the display unit.

3. The display system according to claim 1, wherein the selected specific item is updated in real time in response to an update of the driving of the vehicle.

4. The display system according to claim 3, wherein the widget is switched into a detailed screen displaying the selected specific item displayed by the widget on the map screen in detail depending on a manipulation of the user.

5. The display system according to claim 1, wherein the display unit includes a touch panel to which the data are input depending on a touch operation of the user.

6. The display system according to claim 1, wherein the my menu changes at least one of a display size, a display position, and a display scheme of the selected specific item displayed through the display unit in response to the data input to the input unit.

7. The display system according to claim 1, wherein the controller receives information updated depending on the driving of the vehicle, generates a driving pattern of a driver driving the vehicle in response to the updated information, and displays the selected specific item in real time depending on the generated driving pattern.

8. The display system according to claim 1, further comprising, when the vehicle is a vehicle driven by electricity:

a battery management system (BMS) managing a state of a battery provided in the vehicle, and including a battery controller unit (BCU) controlling the battery; and a sensor unit measuring and sensing the driving state of the vehicle using a plurality of sensors disposed inside and outside the vehicle, wherein the controller calculates a drivable distance of the vehicle on the basis of information on the battery input from the BMS and a speed of the vehicle sensed from the sensor unit and displays the drivable distance on the my menu or displays a remaining capacity of the battery on the my menu based on the information on the battery.

9. The display system according to claim 1, wherein the controller allows information on a charging station or an gasoline station closest to the vehicle in a driving direction of the vehicle to be displayed through the my menu.

10. The display system according to claim 1, wherein when a map is selected by a manipulation of the user, the controller displays the map, a position of the vehicle on the map, and the selected specific item.

11. The display system according to claim 1, wherein the controller extracts use history of the my menu, and provides the user with a message requesting the user if the user desires the selected specific item to be automatically updated depending on the extracted use history.

* * * * *